United States Patent [19]

Madter

[11] Patent Number: 5,506,981

[45] Date of Patent: Apr. 9, 1996

[54] APPARATUS AND METHOD FOR ENHANCING THE PERFORMANCE OF PERSONAL COMPUTERS

[75] Inventor: Richard C. Madter, Pusslinch, Canada

[73] Assignee: All Computers Inc., Toronto

[21] Appl. No.: 130,335

[22] Filed: Oct. 1, 1993

Related U.S. Application Data

[63] Continuation-in-part of Ser. No. 37,875, Mar. 29, 1993.

[51] Int. Cl.⁶ ............................................... G06F 1/04
[52] U.S. Cl. .................................. 395/550; 364/DIG. 2
[58] Field of Search .................................................. 395/550

[56] References Cited

U.S. PATENT DOCUMENTS

4,659,999  4/1987  Motoyama et al. ........................ 331/2

Primary Examiner—Thomas M. Heckler
Attorney, Agent, or Firm—Kenneth M. Garrett

[57] ABSTRACT

An accelerator board for use in replacing the microprocessor of a slow speed system board with a microprocessor operating at a higher clock speed. The clock signal of the accelerator board is derived from the clock signal of the system board by first deriving a sub-harmonic frequency which is a common denominator of both the system board and the accelerator board clock signal, and using the sub-harmonic signal to control a phase locked loop oscillator to provide the desired clock speed for the accelerator board. The arrangement provides a known phase relationship between the system clock signal and the accelerator board clock signal ( which facilitates data transfer between the system board and the accelerator board. The arrangement also provides a stable clock signal for the accelerator board in those instances where the clock speed of the system board may change for certain I/O operations of the system board.

8 Claims, 7 Drawing Sheets

Fig. 7a  Data Latch Control  Logic Equations L5A, L5B

Fig. 7b

Fig. 8a  System access control signal gating  Logic Equations L6A, L6B

Processor Conversion  Logic Equations L6C, L6D, L6E

Fig. 9a  Address Latch Control

APPARATUS AND METHOD FOR ENHANCING THE PERFORMANCE OF PERSONAL COMPUTERS

This application is a continuation in part of application Ser. No. 08/037,875 filed Mar. 29, 1993.

FIELD OF INVENTION

This invention relates to accelerator board devices that may be used to replace a microprocessor of a personal computer system which operates at a relatively slow speed in comparison to that of the replacement microprocessor to enhance the performance of the system.

BACKGROUND OF INVENTION

One way to increase the performance of a personal computer system is to replace the microprocessor in the system with a higher speed microprocessor operating on a higher clock rate, preferably with a cache memory and optionally, on a local bus, high speed memory and certain high speed peripherals such as video display controllers. Other peripheral circuits such as direct memory access (DMA), floppy and hard disk controllers, interrupt controllers and timers of the computer system may be accessed at the clock rate of the original microprocessor clock. Although replacing all of the peripheral circuits in the computer system with circuits which can operate at the new higher speed would yield maximum performance, the cost would be high and many of the higher speed circuits would achieve only small performance increases.

Therefore it is cost effective to replace only those parts of the computer system which give the highest increase in performance for the cost.

In accordance with one prior art proposal, a clock signal for the operation of a high speed replacement microprocessor is generated using a high speed free running oscillator independent of the clock of the slow speed system board. To perform data transfers with the slow speed computer system board, the signals going to the system board are first synchronized to the microprocessor clock of the system board, and then the returning signals are synchronized to the high clock frequency of the replacement microprocessor. However, this double synchronization process for access to the slower peripheral circuits can impose a severe performance penalty. Providing that the ratio of new to original microprocessor clock rates combined with the hit ratio of the cache or high speed local memory are sufficient, the performance will increase, but the increase would be greater if some of the synchronizing delays can be reduced or eliminated. In cases where the clock ratio is small and/or the cache or local memory hit ratio is small, a reduction in performance compared to the original computer system can be expected due to the synchronizing delays.

Other solutions have switched the replacement microprocessor clock rate from the new higher speed to the clock rate of the slow speed system board for data transfers with the slow speed system board, but with the advent of microprocessors with clock doubling or tripling on chip, it is often necessary to have a stable frequency for the new microprocessor clock. In other cases buffering on the microprocessor chip of external data write transfers causes a performance penalty when the microprocessor clock is slowed during these transfers to the slower system peripherals.

In accordance with other proposals, the clock signal for the operation of the replacement microprocessor is derived from the clock system of the slow speed system. However, with certain slow speed systems the clock speed may switch between two rates, thereby compounding the difficulty of providing a stable clock signal for the operation of the high speed replacement microprocessor.

OBJECTS OF THE INVENTION

It is an object of this invention to provide apparatus and method for the replacement of a slow speed microprocessor in a system board with a high speed microprocessor.

It is another object of this invention to provide such apparatus and method wherein the high speed clock signal is derived from the slow speed system board clock signal in known phase relationship therewith.

It is yet another object of this invention to provide apparatus and method wherein the high speed clock signal for the operation of the replacement microprocessor is generated in known phase relationship from the slow speed system board notwithstanding the switching of the frequency of the slow speed system board clock signal between different frequencies.

It is still another object of this invention to provide apparatus and method wherein a microprocessor of a slow speed system board is replaced by a high speed microprocessor which facilitates data transfer between the slow speed system board and the replacement microprocessor.

SUMMARY OF INVENTION

In accordance with one aspect of this invention, an accelerator board plug-in replacement to the microprocessor socket of a system board includes a sub-harmonic signal generator responsive to the clock signal of the system board. The sub-harmonic signal is selected to have a frequency that is a common denominator of the frequency of the system board clock and a clock signal for the operation of an enhanced microprocessor contained on the accelerator board. Preferably, the common denominator will have a value which is the highest common denominator of all of the desired frequencies of the clock speeds at which the system board and the accelerator board will function. The second clock signal is derived from the sub-harmonic signal using a phase locked loop oscillator. The advantage of this arrangement is that the first and second clock signals will maintain a synchronized phase relationship. The accelerator board will normally include means for generating transfer requests synchronous with the first clock signal and transfer acknowledge signals synchronous with the second clock signal, which, owing to the maintenance of a desired phase relationship between the first and second clock signals, will occur with minimal delays.

The arrangement permits the generation of a stable second clock signal even when the frequency of the first clock signal synchronously changes, as is the case with certain system boards.

These foregoing objects and aspects of the invention, together with other objects, aspects and advantages thereof will be more apparent from the following description of a preferred embodiment thereof, taken in conjunction with the following drawings.

DESCRIPTION OF THE PREFERRED EMBODIMENT

Figure 1:
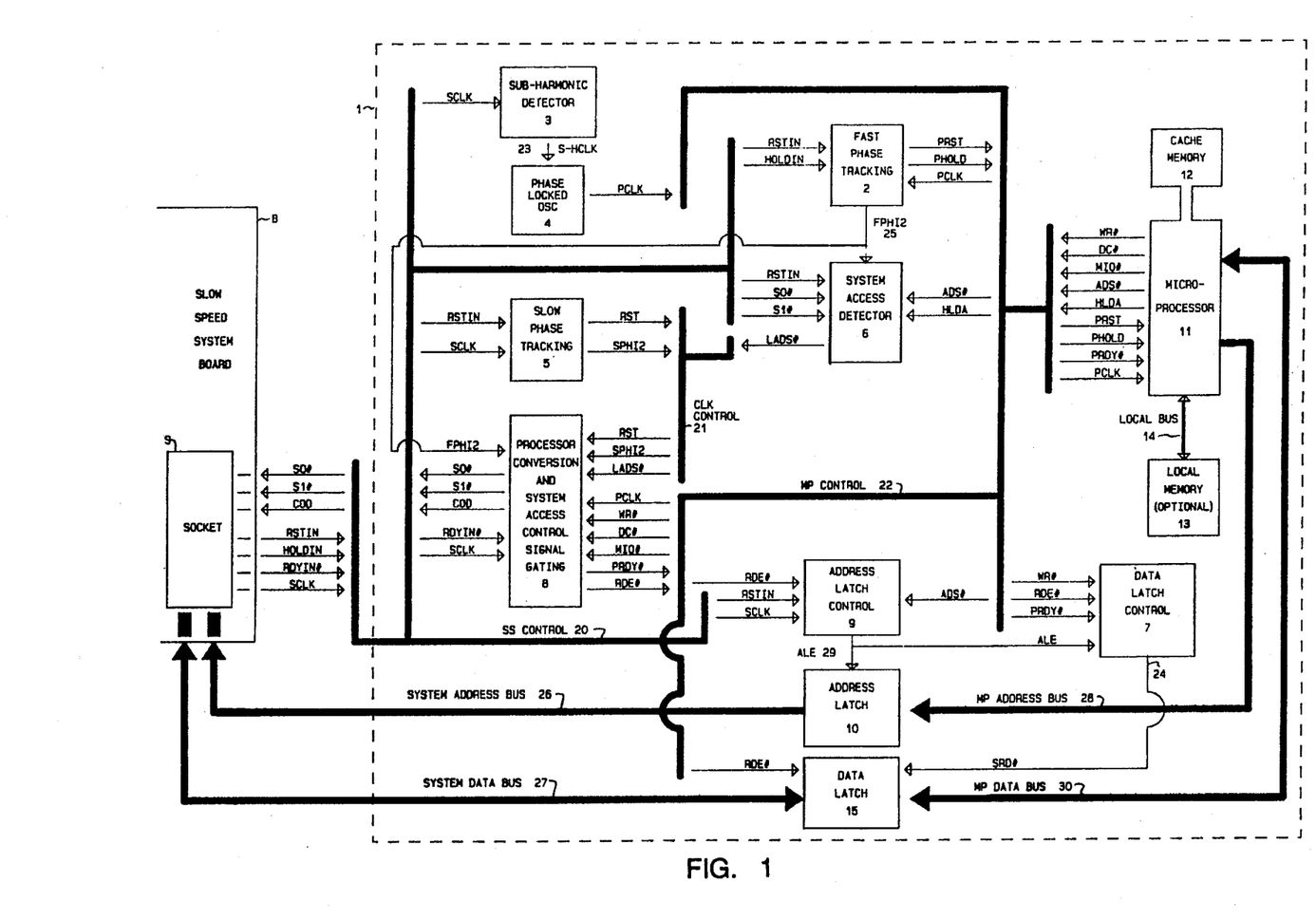
FIG. 1 shows in schematic form an accelerator board in accordance with the invention enclosed within a dashed outline, together with a portion of a slow speed system board with which the accelerator board is employed.

Referring to the drawings in detail, an accelerator board in accordance with the invention is identified generally by the numeral 1.

Accelerator board 1 comprises a plurality of function blocks identified as follows:

2. Fast Phase Tracking
3. Sub-Harmonic Generator
4. Phase Locked Oscillator
5. Slow Phase Tracking
6. System Access Detector
7. Data Latch Control
8. System Access Control signal gating and Processor Conversion
9. Address Latch Control
10. Address Latch
15. Data Latch Accelerator board 1 further comprises a microprocessor 11 which will typically although optionally include an associated cache memory block 12, and which may optionally have an associated local memory block 13 connected via a local bus 14. The local bus may optionally connect to other peripheral devices such as video display controller or hard disk controller, for example.

Three major bus lines each made up of multiple conducting paths interconnect function blocks 2–10 as will be more particularly described. These major bus lines and the control signal paths and signals carded thereon are identified as follows:

| Signal Name | Signal Description |
|---|---|
| 20 - System Control Bus (SS Bus) | |
| S0# | System Status 0 inverted |
| S1# | System Status 1 inverted |
| COD | System Code/Interrupt Ack. |
| RSTIN | System Reset |
| SCLK | System Clock |
| RDYIN# | System Ready Inverted |
| HOLDIN | System Hold Request |
| 21 - Clock Control Bus (CLK Bus) | |
| RST | Internal Reset |
| SPHI2 | Slow Phase/2 |
| LADS# | Latched Address Select inverted |
| 22 - Microprocessor Control Bus (MP Bus) | |
| PCLK | Processor Clock |
| PRST | Processor Reset |
| PHOLD | Processor Bus Hold Request |
| HLDA | Processor Bus Hold Acknowledge |
| ADS# | Address Select inverted |
| MIO# | Memory, I/O inverted |
| DC# | Data, Control inverted |
| WR# | Write, Read inverted |
| PRDY# | Processor Ready inverted |
| RDE# | Ready Enable inverted |

Minor bus lines are also provided on accelerator board 1, and these, the signal paths and signals carded thereon are identified as follows:

| Bus | Signal Name | Signal Description |
|---|---|---|
| 23 | S-HCLK | Sub-Harmonic Clock |
| 24 | SRD# | System Read Data Latch Enable inverted |
| 25 | FPHI2 | Fast Phase/2 |
| 26 | | System Address Bus |
| 27 | | System Data Bus |
| 28 | | Microprocessor Address Bus |
| 29 | ALE | Address Latch Enable |
| 30 | | Microprocessor Data Bus |

In accordance with convention the symbol "#" is used to indicate that the signal is asserted in a low condition in the logic circuitry employed. It will be appreciated that with other circuitry the signal could equally be asserted in a high condition.

Accelerator board 1 is used in conjunction with a slow speed system board B which will normally include a socket S for a microprocessor for which board B was designed, which microprocessor will be responsive to those signals on SS Bus 20 indicated above. In this case it will be recognized that these signals form pan of the control signals for a 80286 microprocessor. This "slow" microprocessor is removed from the slow system board B and may be consequently referred to hereinafter as a ghost microprocessor. Accelerator board 1 includes pin connectors (not shown) which are receivable in socket S to interconnect SS Bus 20 to socket S; such pin connectors will also connect System Address Bus 26 and System Data Bus 27 to socket S to provide for the transfer of data between the slow system board and microprocessor 11. The control signals on MP Control bus 22 will be recognized as part of the control signals of an 80386SX microprocessor. Given that this latter microprocessor has a different Address and Control timing than that of the ghost microprocessor, System Address Bus 26 is connected to microprocessor 11 through Address Latch 10 and the MP Address Bus 28, the operation of which will be further described. In addition the change in microprocessor clock, causes the Data Bus timing of the new microprocessor and the slow speed system board to be different. The System Data Bus 27 is connected to microprocessor 11 through Data Latch 15 and the MP Data Bus 30, the operation of which also will be further described.

GENERAL OVERVIEW OF CIRCUIT OPERATION

Slow speed system board B will normally include a continuously operational crystal clock that generates the clock signal SCLK intended to clock the ghost microprocessor originally present on board B. Many systems use a higher speed crystal clock and a divide by 2 to generate SCLK, while some use a divide by K, where K might be normally 2 but is increased to 3 to slow the system clock for data transfers on an I/O expansion bus forming a part of the slow speed system board. This causes SCLK to be synchronously switched between two rates. The Sub-Harmonic generator 3, produces S-HCLK 23 which is a synchronized to SCLK as a low sub-harmonic of SCLK. This permits many different SCLK frequencies to be synchronized as different harmonics of S-HCLK. As an example a slow speed system board may use a 48 Mhz crystal clock and normally divide the clock by 2 to produce a 24 Mhz SCLK signal, but synchronously change SCLK to 16 Mhz for certain I/O operations by changing the divider to 3. By using a Sub-Harmonic frequency of say 4 Mhz, both the 24 Mhz and the 16 Mhz SCLK frequencies can be synchronized, as well as other frequencies of which S-HCLK is a common denominator, such as 12, 20, 28 and 32 Mhz. The Sub-harmonic frequency S-HCLK is sent to Phase Locked Oscillator 4 which multiplies in a standard Phase Locked Loop (PLL) fashion, the Sub-harmonic frequency by a whole number N to produce the high frequency clock signal PCLK for the new microprocessor.

The various functional blocks that were introduced briefly above, the control signals and their manner of operation in generating the high frequency PCLK so as to maintain a desired phase relationship between the SCLK and PCLK signals are more particularly described hereinafter. The functional blocks may be incorporated into a plurality of programmable array logic (PAL) devices, or integrated into one or more LSI chips. The logic equation or equations in accordance with which each functional block operates are also set out where appropriate.

Figure 2A:
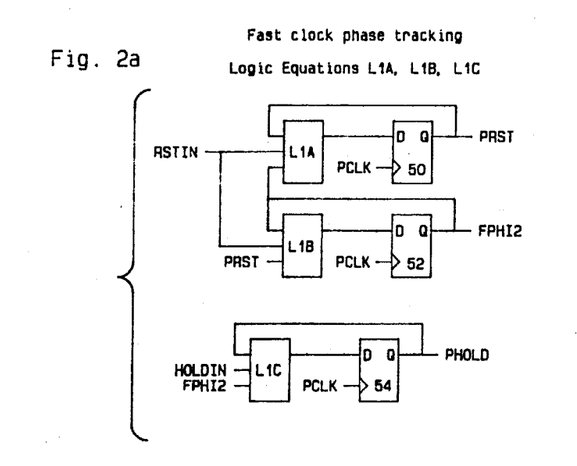
FIGS. 2a, 3a, 4, 5a, 6a, 7a, 8a and 9a show in schematic form the various function blocks respectively labelled 2–9 in the accelerator board of FIG. 1.
Figure 2B:
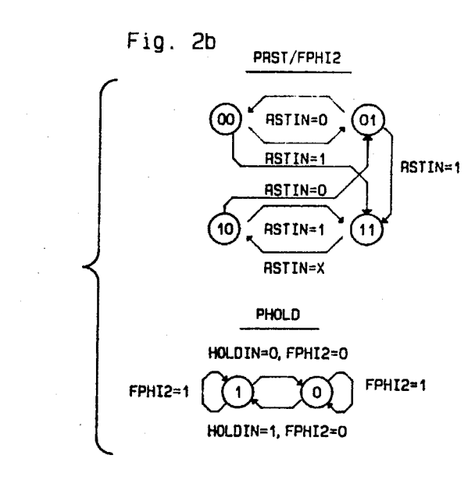
FIGS. 2b, 3b, 5b, 6b, 7b, 8b and 9b show state transition diagrams for correspondingly numbered ones of the above function blocks.

Fast clock Phase Tracking (FIGS. 2a and 2b)

The logic equations in accordance with which this functional block operates are as follows:

L1A: /PRST = /RSTIN * /PRST + /RSTIN * /FPHI2

L1B: /FPHI2 = FPHI2 * /RSTIN + FPHI2 * PRST

L1C: /PHOLD = /FPHI2 * /HOLDIN + FPHI2 * /PHOLD

The state transition diagrams for this block are depicted in FIG. 2b.

Considering as a whole a slow speed system board B and accelerator board 1 combined therewith, at start up a reset signal RSTIN is generated by board B and received on SS bus 20. RSTIN is synchronized according to state transition diagram FIG. 2b to form PRST which serves to reset microprocessor 11 and FPHI2 to track the internal phase of the microprocessor.

In accordance with convention, the state transition diagrams used throughout represent a current state of the logic variable by the logic value within a circle.

The directed line segments that emanate from the circles with the corresponding logic conditions, enter circles showing the logic values of the next state. With specific reference to FIGS. 2a and 2b, a transition is made from the current state to the next state on the next positive edge of PCLK, following the assertion of the logic conditions on any directed line segment emanating from the circle representing the current state. Starting with state (0,0) representing PRST=0 and FPHI2=0, and following the lines with condition RSTIN=0 from (0,0) to (0,1) and back to (0,0) shows that PRST remains at logic 0 and FPHI2 toggles between logic 0 and logic 1 on each positive edge of PCLK received by flip-flop 50 for as long as the signal RSTIN remains at logic 0. When RSTIN goes to logic 1, the next state becomes (1,1) from either previous state (0,0) or (0,1) and then toggles between states (1,0) and (1,1) on each positive edge of PCLK received by flip-flop 52 for as long as RSTIN=1.

This means that PRST and FPHI2 both go to logic 1 on the next positive edge of PCLK following RSTIN going to logic 1 and subsequent positive edges of PCLK, FPHI2 toggles between logic 0 and logic 1 while PRST remains at logic 1. This completes the synchronization of PRST with PCLK and sets the phasing of FPHI2. Finally when RSTIN goes to logic 0, the circuit waits until state (1,0) and then goes to state (0,1) and toggles between states (0,0) and (0,1). Thus FPHI2 toggles with the original phasing derived from RSTIN going to logic 1 but PRST remains asserted at logic 1, until RSTIN negates to logic 0 and FPHI2 is at logic 0 before PRST negates to logic 0.

Also illustrated in FIG. 2a is a circuit to synchronize HOLDIN, generated on the slow system board B, with FPHI2 to generate the signal PHOLD for microprocessor 11, using flip-flop 54 operating in accordance with logic equation L1C above. The corresponding state transition diagram also shown in FIG. 2b shows that PHOLD follows the state of HOLDIN but in phase with FPHI2 such that all state changes of PHOLD are on the positive edge of PCLK following the condition that FPHI2=0. This sets the proper timing conditions on PHOLD for use by microprocessor 11.

Figure 3A:
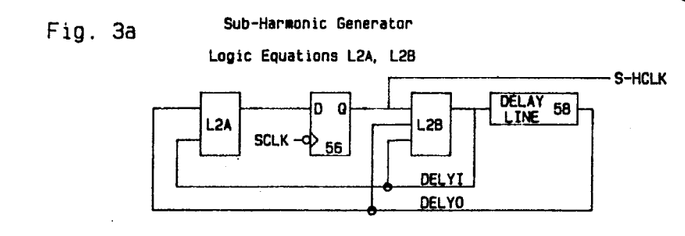
Figure 3B:
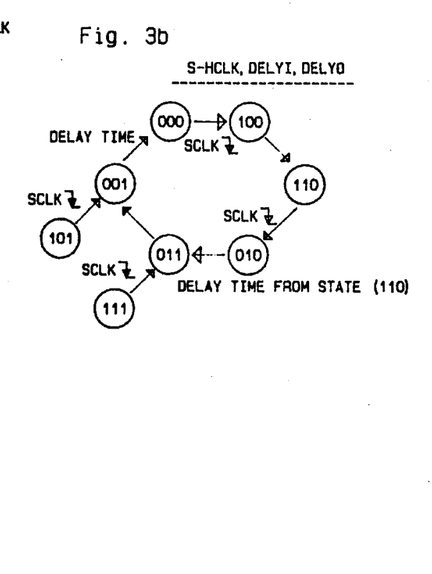

Sub-Harmonic Generator (FIGS. 3a and 3b)

The sub-harmonic generator block 3, functions in accordance with the following logic equations:

L2A: S-HCLK = /DELYI * /DELYO

L2B: DELYI = S-HCLK + DELYI * /DELYO

The Sub-Harmonic generator uses in addition to logic equations L2a and L2b, flip-flop 56 and delay line 58. Referring to the state transition diagram of FIG. 3b, it should be noted that all eight possible states of the 3 variables S-HCLK, DELYI and DELYO are shown although two of the states can only occur as a result of the unknown state of flip-flop 56 at power-on. The explanation will begin at state (0,0,0); if this is not the state at power-on, the circuit will go through the state (0,0,0) within a few clock cycles of SCLK. From state (0,0,0), the circuit goes to state (1,0,0) on the next negative edge of SCLK and then immediately to state (1,1,0). This means that S-HCLK goes from logic 0 to logic 1 followed by DELYI (input to the delay line) also going from logic 0 to logic 1. Since the time through the delay line is greater than the period of the system clock SCLK, the next negative edge of SCLK changes the state to (0,1,0) with S-HCLK returning to logic 0. When the delay time from state (1,1,0) expires, DELYO (delay line output) goes to logic 1 moving the state to (0,1,1) and then immediately to state (0,0,1), DELYI going to logic 0. After a further delay time from state (0,0,1), DELYO goes to logic 0 bringing the state back to the starting point of (0,0,0). At this point it should be noted that S-HCLK is pulsed to logic 1 for one period of SCLK per fixed time interval as determined by two times the delay introduced in accordance with logic equation L2b and the delay line 58. In the example of a 4 Mhz S-HCLK signal, the time delay in accordance with of logic equation L2b and delay line 58 is chosen for a minimum of 110 nanoseconds (ns) and a maximum of 120 ns. This produces a S-HCLK signal at a rate of 4 Mhz and synchronized to the slow system board clock SCLK for any of the following rates: 12, 16, 20, 24, 28 or 32 Mhz.

Figure 11:
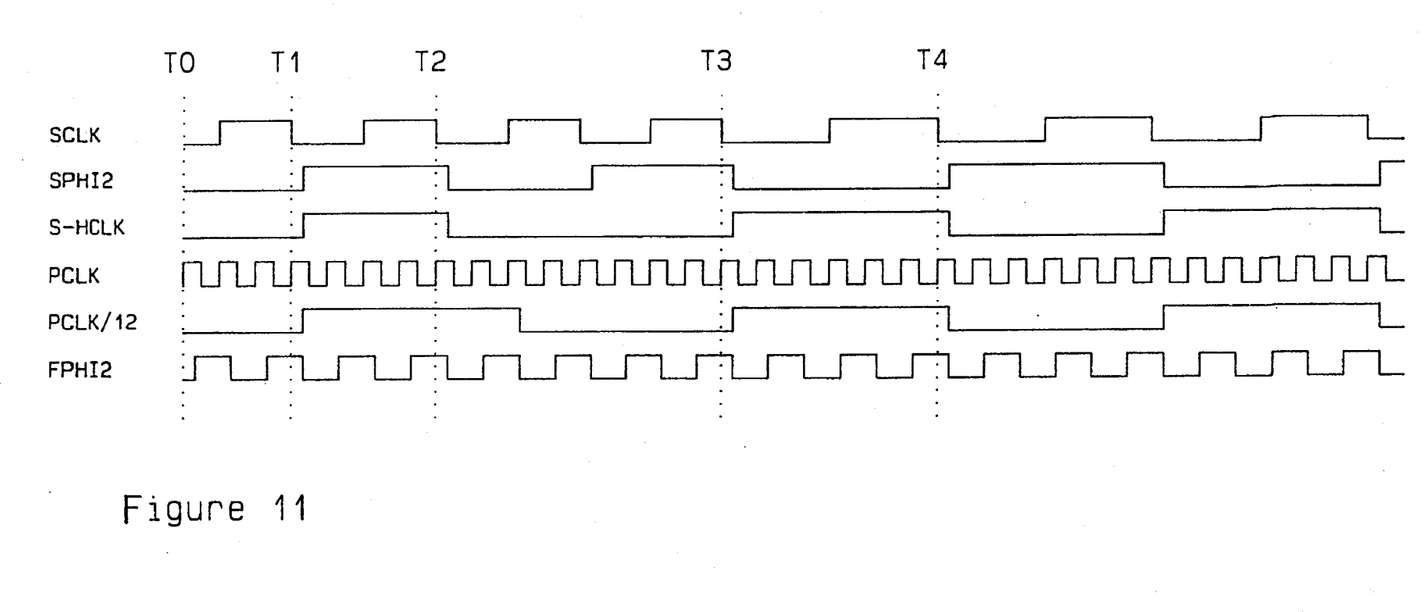

Referring to the timing diagram of FIG. 11, an example of S-HCLK operating at a rate of 4 Mhz is shown. The S-HCLK signal is generated from an SCLK signal of an initial rate of 12 Mhz and at T3 switches to a rate of 8 Mhz.

Since both of the SCLK rates are multiples of the S-HCLK rate, the only change in the S-HCLK signal between the two SCLK rates is in the logic 1 pulse width. The pulse width is equal to the period of SCLK as shown in FIG. 11 between time points T1 and T2 for the 12 Mhz rate and between T3 and T4 for the 8 Mhz rate.

Figure 4:
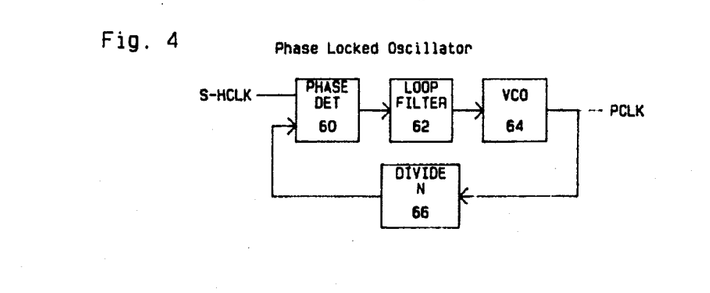

Phase Locked Oscillator (FIG. 4)

The phase locked oscillator block 4, comprises a phase detector 60, a loop filter 62, a Voltage Controlled Oscillator (VCO) 64 and a divide by N circuit 66 connected to form a standard Phase Locked Loop (PLL) oscillator which generates the microprocessor clock signal PCLK. The phase detector 60, generates positive or negative output pulses depending upon whether the positive edge of S-HCLK leads or lags in time the positive edge of the output of the Divide by N circuit 66 respectively. The loop filter sums and filters the positive and negative pulses from the phase detector 60 to produce a voltage which is sent to the VCO circuit 64. The VCO circuit generates a clock output PCLK of a frequency rate that is responsive to the input voltage from the loop filter circuit. The PCLK signal is divided by a whole number N in the Divide by N circuit of block 66, the output of which is sent to the phase detector for comparing the phase with the signal S-HCLK.

Should the positive edge of S-HCLK be leading (occur first in time sequence) the positive edge of the Divide by N output, the phase detector will output a positive pulse, the loop filter will increase the output voltage, the VCO will increase the frequency of PCLK and the output of the Divide by N circuit will increase in frequency. This frequency increase will cause the positive edge to occur sooner and thus decrease the time difference to the positive edge of S-HCLK. Similarly if S-HCLK lags (occurs later in time sequence) the Divide by N output, the phase detector will output a negative pulse, the loop filter will decrease the output voltage, the VCO will decrease the frequency of PCLK and the output of the Divide by N circuit will decrease in frequency. This frequency decrease will cause the positive edge to occur later and thus decrease the time difference to the positive edge of S-HCLK. With the appropriate loop filter characteristics to give the entire loop proper control system dynamics, the PLL should quickly stabilize with the positive edges of S-HCLK and Divide by N output aligned. At this time, the PLL is said to be locked and the frequency of PCLK is N times the frequency of S-HCLK. Since complete PLL circuits can be purchased in a single Integrated Circuit package no further circuit detail or logic equations will be presented here.

FIG. 11 shows an example of a locked PLL with N=12 and a S-HCLK rate of 4 Mhz. At time T1, the positive edges of S-HCLK and PCLK/12 (output of Divide by N circuit 66 for N=12) are aligned as are the negative edge of SCLK and the positive edge of PCLK. Since the phase detector 60 is edge sensitive only, the change in the pulse width of S-HCLK from T1 to T3 as the frequency of SCLK is switched has no effect on the PLL operation.

Many different values for N in the Divide circuit 66 may be used to select the rate of the microprocessor clock PCLK such as N=12 for a 48 Mhz microprocessor clock rate or N=16 for a 64 Mhz microprocessor clock rate.

Figure 5A:
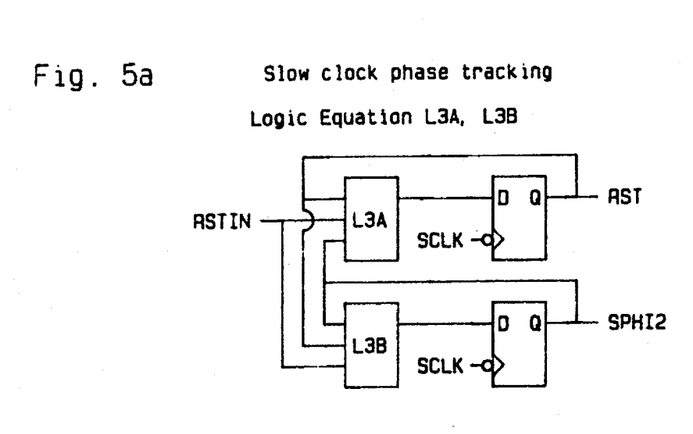
Figure 5B:
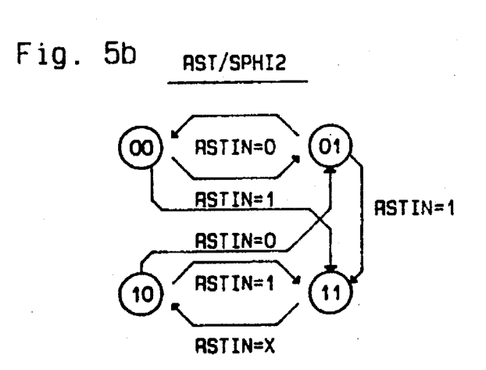

Slow Phase Tracking (FIGS. 5a and 5b)

The Slow phase tracking block 5 operates in accordance with the following logic equations

L3A: /RST = /RSTIN * /RST + /RSTIN * /SPHI2

L3B: /SPHI2 = SPHI2 * RST + /RSTIN * SPHI2

The corresponding state transition diagram is shown as FIG. 5b. The slow phase tracking circuit 5 outputs control signal RST, an internal reset signal, and SPHI2 which serves to track the internal phases corresponding to the ghost 80286 microprocessor. The state transition diagram of FIG. 5b is similar to that for the PRST and FPHI2 outputs shown in FIG. 2b except that the state transitions here occur on the negative edge of SCLK.

Figure 6A:
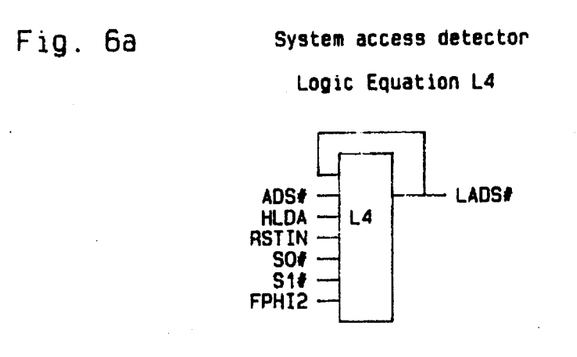
Figure 6B:
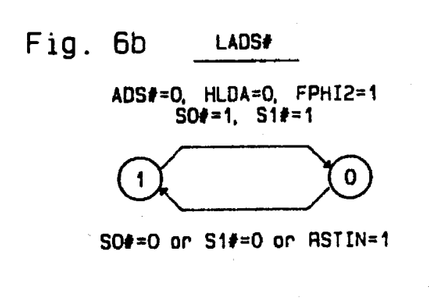

System Access Detector (FIGS. 6a and 6b)

The system access detector block 6, generates signal LADS# in accordance with the following equations:

L4: /LADS# = /ADS# * S0# * S1# * /HLDA * FPHI2 +

S0# * /LADS# * S1# * /RSTIN

The LADS# signal serves to maintain the address select state of the microprocessor 11 for the system access control signal gating and processor conversion circuits. The state transition diagram of FIG. 6b, shows that the asserted ADS# (logic 0) causes LADS# to assert to logic 0 providing that HLDA=0 indicating no bus hold acknowledge, and both S0#=1 and SI#=1 indicating no system status is presently gated to the system are true. The LADS# signal remains at logic 0 until the system status is gated by the processor conversion circuit to the system, with S0#=0 and/or SI#=0, then LADS# negates to logic 1. When devices such as local memory 13 are present on the local bus 14, the equation for LADS# is changed to exclude accesses by microprocessor 11 to the local bus from asserting LADS#.

Figure 7A:
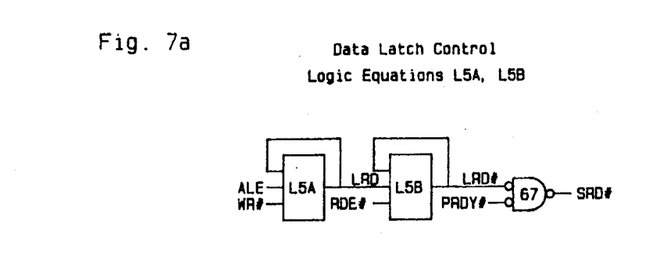
Figure 7B:
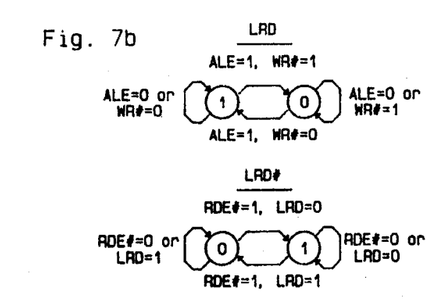

Data Latch Control (FIGS. 7a and 7b)

The data latch control block 7 operates in accordance with logic equation L5a and L5b as follows:

L5A: /LRD = ALE * WR# + /ALE * /LRD + WR# /LRD

L5B: /LRD# = RDE# * LRD + /RDE# * /LRD# +

LRD */LRD#

The corresponding state transition diagram of FIG. 7b shows the generation of LRD, a latched read command signal, which follows the microprocessor control signal WR# inverted when address latch enable signal ALE 29 is at logic 1. When ALE goes to logic 0, LRD latches in the present state until the next time ALE goes to logic 1. FIG. 7b also shows the generation of LRD# which is similarly formed by latching LRD with RDE#, such that LRD# goes to logic 0 as a result of LRD=1 indicating a Read command while RDE#=1 and is latched in this state when RDE# asserts. Finally, LRD# is gated by PRDY# in Or gate 67 to form SRD# such that SRD# is logic 0 only for a Read command and when PRDY#=0 indicating that the microprocessor is ready to read the data.

Under the above condition, SRD#=0 serves to enable the data latch 15 in the direction for a Read command, that is from the System Data bus 27 to the MP Data bus 30. When the SRD# signal is a logic 1, the data latch 15 is enabled in the opposite direction from the MP Data bus 30 to the System Data bus 27 for a possible Write command. When devices such as local memory 13 are present on the local bus 14 the equation for LRD needs to be changed to exclude accesses by microprocessor 11 to the local bus from asserting LRD to logic 1. In addition for the read operation, RDE# is used to control the latching function of the data latch in block 15. While RDE# is logic 0, the data latch is open and closes when RDE# goes to a logic 1 which corresponds to the instant in time that the ghost microprocessor would have latched the data on a read operation.

Figure 8A:
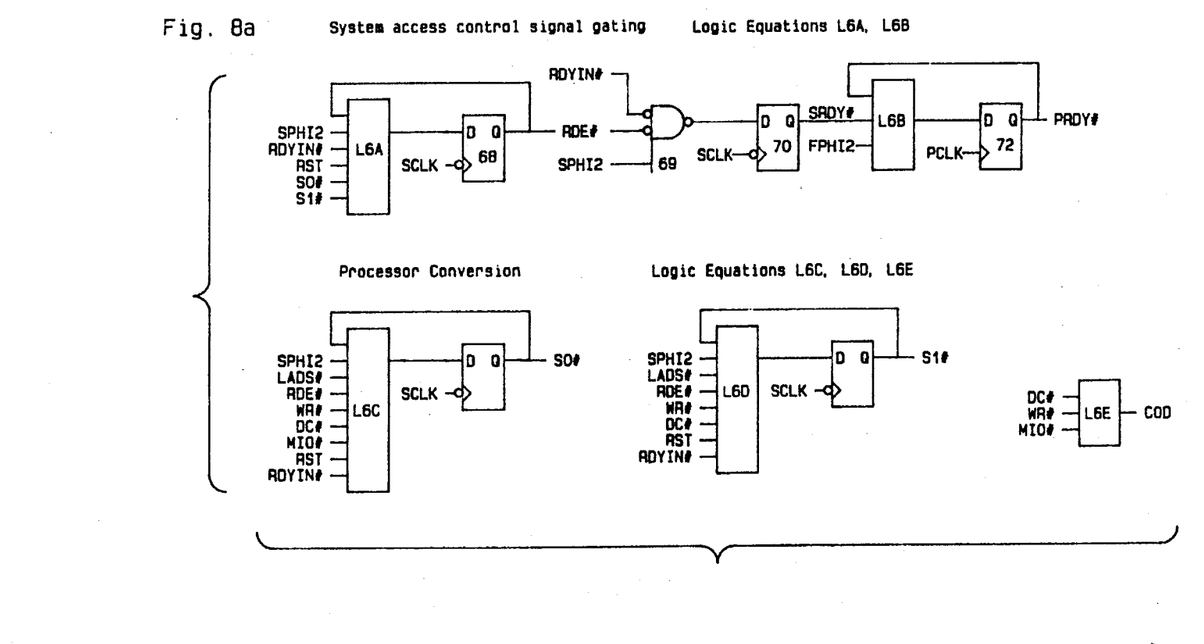
Figure 8B:
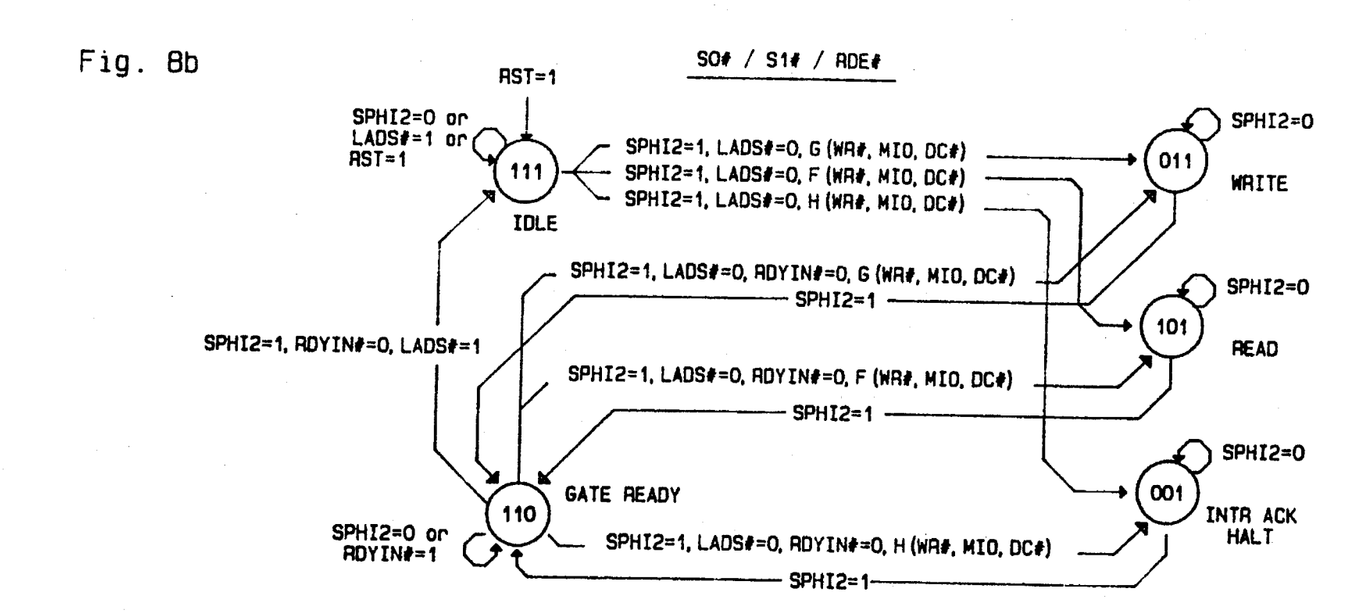

System Access Control Signal Gating and Processor Conversion (FIGS. 8a and 8b)

The system access control signal gating portion of block 8 serves to generate the system ready gating signal RDE# in accordance with logic equation L6A:

L6A: /RDE# = /SPHI2 * RDE# + /RDYIN# * SPHI2 *

S1# * S0# + S1# * S0# * RDE# + RST

The RDE# signal from flip-flop 68, gates the inverted ready RDYIN# from the system board B at or gate 69 to synchronizing flip-flop 70. The SRDY# signal at the output of flip-flop 70, asserts at the same instant that the ghost microprocessor would have sampled the inverted ready signal RDYIN# if the ghost microprocessor were still connected to the slow system board B. The SRDY# signal is properly phased to produce PRDY# to the microprocessor 11 in accordance with logic equation L6B under the control of and flip-flop 72 as follows:

L6B: /PRDY# = FPHI2 * /SRDY# + /FPHI2 * /PRDY#

The processor conversion circuit portion of block 8 serves to generate the system status signals S0# and S1# and the Code/Interrupt acknowledge signal COD. This portion of block 8 functions in accordance with logic equations L6C, L6D and L6E as follows:

L6C: /S0# = SPHI2 * /LADS# * RDE# * /WR# * /RST +

SPHI2 * /LADS# * RDE# * /DC# * /MIO# * /RST +

/RDYIN# * SPHI2 * /LADS# * WR# * /RST +

/RDYIN# * SPHI2 * /LADS# * /DC# * /MIO# * /RST +

/SPHI2 * /S0#

L6D: /S1# = SPHI2 * /LADS# * RDE# * /WR# * /RST +

SPHI2 * /LADS# * RDE# * /DC# * /RST +

/RDYIN# * SPHI2 * /LADS# * WR# * /RST +

/RDYIN# * SPHI2 * /LADS# * /DC# * /RST +

/SPHI2 * /S1#

L6E: /COD = DC# * MIO# +

/DC# * /MIO# + WR# * MIO#

The state transition diagram for the signals S0#, S1# and RDE# is shown in FIG. 8b. The signal COD does not necessitate a transition diagram as it is merely a combinational function of the microprocessor control signals DC#, WR# and MIO#. The signal RST from the slow phase tracking block 5, when at logic 1 negates all three signals S0#, S1# and RDE# to logic 1, which is the Idle state (1,1,1). The signals remain in this state until a system access is detected causing LADS#=0 and until SPHI2=1 indicating the proper phasing for the system status to be asserted. On the negative edge of SCLK following the assertion of this condition and depending upon the microprocessor access command formed by the signals WR#, DC# and MIO#, the signals S0#, S1# and RDE# will change to one of the following states—Write access (0,1,1), Read access (1,0,1) or Halt, Shutdown, Interrupt Acknowledge access (0,0,1). The following table summarizes the conditions for each transition:

| WR# | DC# | MIO# | Access Type | S0# | S1# |
|---|---|---|---|---|---|
| 0 | 1 | 1 | Memory Data Read | 1 | 0 |
| 0 | 1 | 0 | I/O Data Read | 1 | 0 |
| 0 | 0 | 1 | Memory Code Read | 1 | 0 |
| 1 | 1 | 1 | Memory Data Write | 0 | 1 |
| 1 | 1 | 0 | I/O Data Write | 0 | 1 |
| 0 | 0 | 0 | Interrupt Acknowledge | 0 | 0 |
| 1 | 0 | 1 | Halt, Shutdown | 0 | 0 |

On the second negative edge of SCLK following this state transition, SPHI2 will be logic 1, and the state will change to Gate Ready (1,1,0) where RDE# is logic 0 and gates the system ready RDYIN# through the Or gate and flip-flop 70 as previously described to form the signal SRDY#. The signals remain in state (1,1,0) until the negative edge of SCLK that corresponds to the ghost microprocessor sampling and finding RDYIN# asserted. The condition for this is RDE#=0 and SPHI2=1 and RDYIN#=0. Here the state transition can go back to the Idle state (1,1,1) if LADS#=1 for no pending system accesses, or to the Write state (0,1,1), Read state (1,0,1) or Halt/Intr state (0,0,1) if LADS#=0 indicating a pending system access request by the microprocessor. The bypassing of the Idle state when the next consecutive system access is pending, eliminates any additional wait states caused by the processor conversion circuit.

Figure 9A:
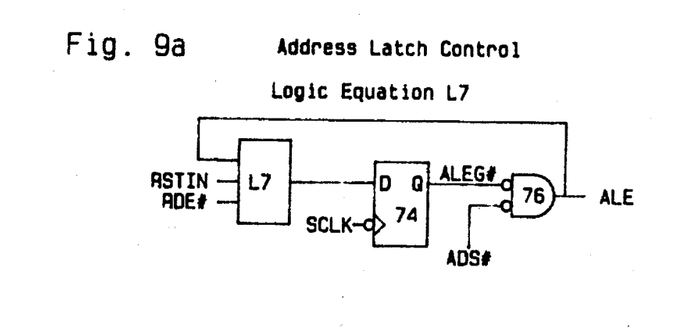
Figure 9B:
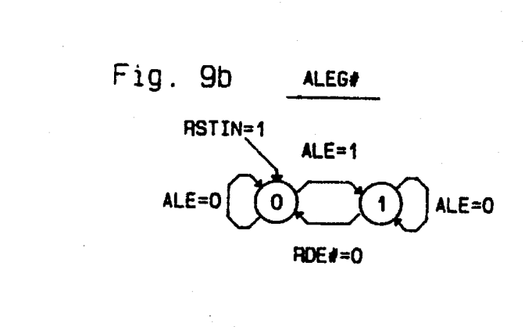

Address Latch Control (FIGS. 9a and 9b)

The address latch control block 9 includes a flip-flop 74 and Nor gate 76 and operates in accordance with logic equation L7 as follows:

L7: /ALEG# = /RDE# + RSTIN + /ALEG# * /ALE

The corresponding state transition diagram FIG. 9b shows that the system reset RSTIN being asserted (logic 1), causes the state of ALEG# to go to logic 0 on the next negative edge of SCLK which enables ADS# at the Nor gate to produce a logic 1 on ALE when ADS# is next asserted (goes to logic 0). The signal ALE is connected to the Address latch 10 on bus 29 and when ALE is set to a logic 1, the Address latch is open connecting the MP Address bus 28 to the System Address bus 26. Once ALE is at logic 1, the next negative edge of SCLK will cause the state of ALEG# to change to logic 1 which negates ALE (logic 0) and closes the address latch. The latch remains closed as ALEG# is logic 1 until the next negative edge of SCLK following RDE#=0 when ALEG# goes to logic 0 to open the address latch again as soon as ADS# asserts. Thus the address latch 10 which locates between the MP Address bus 28 and the System Address bus 26 opens at least one cycle of clock SCLK prior to the system status being asserted and remains closed for at least one cycle of SCLK past the system status being negated. This satisfies the timing requirements for the address bus to the system.

OPERATION OF THE COMBINED SYSTEM

Figure 10:
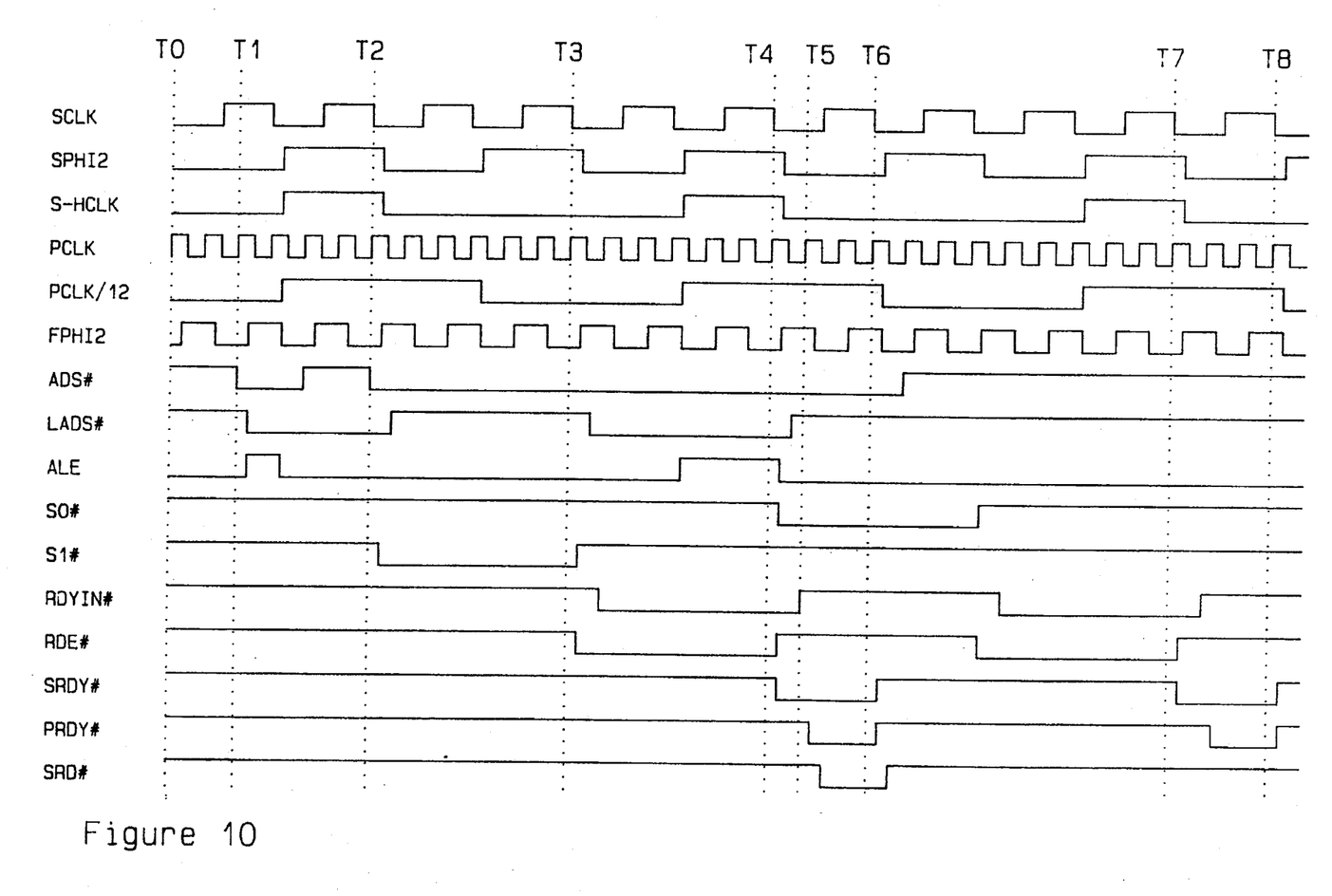
FIGS. 10 and 11 show timing diagram for certain of the control signals used in the accelerator board of the invention.

For the purposes of this description it will be assumed that the ghost microprocessor for which the slow speed system board B was designed was an 80286 microprocessor operating at 16 Mhz, and that the microprocessor 11 of the accelerator board 1 is an 80386SX operating at a frequency of 48 Mhz, to which microprocessors the timing diagram of FIG. 10 is applicable. For such system, the frequency of the sub-harmonic generator 3 is conveniently selected to be 4 Mhz, and the phase lock oscillator 4 accordingly to provide a value of N in the divide by N portion of the circuit of twelve.

Initially after power is applied to the system, the Sub-harmonic generator 3 produces the S-HCLK signal, which consists of logic 1 pulses with a width equal to the period of SCLK at a fixed rate of 4 Mhz. The S-HCLK signal 23, connects to the phase lock oscillator 4 which begins to stabilize the rate of signal PCLK/12 (oscillator output PCLK divided by 12) with the rate of the S-HCLK signal. When the phase locked oscillator 4 locks, the S-HCLK and PCLK/12 signals will be in phase (the positive edges will be coincident). This means that the slow speed system board B clock signal SCLK will be synchronized with PCLK, which is to say that periodically negative edges of SCLK will be coincident in time with positive edges of PCLK. It will be appreciated that for other selections of the ghost microprocessor and microprocessor 11, other edges of the signals SCLK and PCLK may be preferred to be coincident. This synchronized condition will remain throughout the operation of the circuit even if the system clock SCLK synchronously changes frequency to another whole number multiple of the S-HCLK signal rate.

The Fast phase tracking circuit 2 generates a signal PRST which is used to reset the microprocessor 11 and is formed by synchronizing the system reset signal RSTIN with the microprocessor clock PCLK. The FPHI2 signal is initialized by PRST so that FPHI2 is in phase with the internal timing state of the 80386SX microprocessor. In addition, the Slow phase tracking block 5 generates the SPHI2 signal which is initialized by the system reset signal RSTIN, so that the SPHI2 signal is in phase with the internal timing state of the ghost 80286 microprocessor.

When an access to the slow speed system board B from the microprocessor 11 is requested by the signal ADS# being asserted (FIG. 10 at T1), the system access detector 6 will assert the signal LADS# (goes to logic 0). The microprocessor 11 is considered to have an on-chip cache memory 12 so that assertion of the Address Select signal ADS# indicates an access to the slow speed system board B peripherals is requested. Also at time T1 the Address latch control circuit 9, asserts the address latch enable (ALE) signal to open the Address latch 10 which locates between the MP Address bus 28 and the System Address bus 26. Opening the Address latch asserts the address for this access onto the System address bus prior to asserting the System status signals S0# and/or S1#. On the next negative transition of SCLK, flip-flop 74 negates signal ALEG# which causes ALE to negate (go to logic 0) at Nor gate 76 which closes the Address latch. This latches the Address to the System address bus as the microprocessor will be asserting a new address at time T2.

In the 80386 to 80286 conversion circuit FIG. 8a, as shown in state transition diagram FIG. 8b, the 80386SX control signals LADS#, WR#, DC# and (MIO# are converted to 80286 control signals S0# and SI# and ready gating signal RDE#. The timing diagram of FIG. 10 shows that the control signal SI# to the system asserts (logic 0) on the negative edge of SCLK and in phase with SPHI2 at time T2 to start the system access. Since the 80386 type processor is capable of pipelined bus cycles and because the microprocessor is running at the faster clock rate of PCLK, the next assertion of ADS# also occurs at T2 and remains until after T6.

The System Access control signal gating and Processor conversion 8, negates S1# (logic 1) after 2 clock periods of SCLK at time T3 and asserts the ready gating signal RDE# (logic 0). As a result of the ready signal RDYIN# from the system board being asserted (logic 0) soon after time T3, the SRDY# signal from flip-flop 70 will assert (logic 0) 2 clock periods of SCLK later at time T4 which is at the time that the ghost microprocessor would have sampled RDYIN# and the System Data bus; the current access to the system board being a Read (SI# is asserted).

Also at T4 when the system board ready RDYIN# is sampled by flip-flop 70, the ready gating signal RDE# is negated (logic 1). During the time that RDE# was asserted (logic 0 from T3 to T4), the Data latch 15 was open and now at T4 closes latching the data from the System Data bus 27.

Next the System Access control signal gating circuit 8, waits for the proper phasing of FPHI2 (FPHI2=1) and then on the next positive edge of PCLK, asserts PRDY# (logic 0) at T5 of FIG. 10. In the Data latch control block 7, the read access has successively asserted latched read signal LRD and then asserted inverted latched read signal LRD# so that when PRDY# is asserted, signal SRD# from Or gate 67 is asserted (logic 0) which enables the output of the Data latch 15. This enables the Read data latched from the System Data bus at time T5, onto the MP Data bus 30. On the positive edge of PCLK at time T6, the micro-processor 11 samples the processor ready signal PRDY# and finds it asserted (logic 0) which causes the MP Data bus to be sampled and completes the Read access to the system board.

Following T6, signals PRDY# and SRD# negate (logic 1) as does the ADS# signal which has been asserted since T2.

The next access to the system board has already begun after T3 with the Address latch control circuit FIG. 9a asserting ALE to open the Address latch 10 and present the address for the next access to the System Address bus 26. On the next negative edge of SCLK at time T4, the ALE signal is negated closing the Address latch. Also at time T4 the Processor conversion circuit asserts signal S0# to the system. Similar to the previous Read access, this Write access asserts S0# for 2 clock cycles of SCLK then negates and asserts the ready gating signal RDE#.

The RDE# signal remains asserted (logic 0) for at least 2 clock cycles of SCLK as shown to time T7 or additional multiples of 2 SCLK clock cycles until System ready signal RDYIN# is found asserted (logic 0).

The System Access control signal gating circuit has asserted SRDY# at T7 and now waits for FPHI2 =1 and the following positive edge of PCLK to assert processor ready signal PRDY# (logic 0) to the microprocessor.

Since this system access is a Write, SRD# is logic 1 and the write data from the microprocessor on MP Data bus 30 is passed through the Data latch 15 onto the System Data bus 27. Finally the microprocessor samples PRDY# asserted (logic 0) and the system access cycle is complete at T8 and following this the signal PRDY# is negated by the System Access control signal gating circuit.

When local memory 13 is used on accelerator board 1, provision is made to allow a signal MEMACC# when asserted (logic 0) to inhibit an asserted ADS# signal from asserting LADS# (going to logic 0) thereby permitting transfers on local bus 14 at the fast PCLK rate. The MEMACC# signal is used by System access detector block 6 and Data latch control block 7 in accordance with the modified logic equations L4 and L5A as follows:

L4: /LADS# = /ADS# * S0# * S1# * /HLDA * FPHI2 *

MEMACC# + S0# * /LADS# * S1# * /RSTIN * MEMACC#

L5A: /LRD = ALE * WR# * MEMACC# +

/ALE * /LRD + WR# * /LRD

I claim:

1. In combination, a computer system board having a socket for a first microprocessor and a clock for generating a first clock signal intended for the operation of said first microprocessor;

an accelerator board connected to said socket to replace said first microprocessor;

said accelerator board having an upgrade microprocessor thereon for operation under the control of a second clock signal having a frequency greater than that of said first clock signal;

means responsive to said first clock signal for generating a sub-harmonic signal at a frequency that is a common denominator of the frequency of said first clock signal and said second clock signal with a known phase relationship between said sub-harmonic signal and said first clock signal; and   phase lock loop oscillator means responsive to said sub-harmonic signal for generating said second clock signal in known phase relationship to said first clock signal.

2. The combination of claim 1, wherein said replaced microprocessor and said upgrade microprocessor have different control signals and wherein signal conversion means is provided on said accelerator board to permit said upgrade microprocessor to emulate said replaced microprocessor.

3. The combination of claim 1, wherein said accelerator board includes at least one of cache memory and local memory.

4. A combination as defined in claim 1 wherein said sub-harmonic signal has a frequency of 4 Mhz.

5. An accelerator board for use in replacing the microprocessor of a computer system board, said computer system board including means for generating a first clock signal at a first frequency for controlling the flow of digital information on said computer system board; said accelerator board comprising:

an enhanced microprocessor for operation by a second clock signal having a second clock frequency higher than said first frequency;

bus means for transmitting said first clock signal to said accelerator board;

a sub-harmonic generator responsive to said first clock signal for generating a sub-harmonic signal in known phase relationship with said first clock signal, the frequency of said sub-harmonic signal being a common denominator of said first clock frequency and said second clock frequency; and   a phase locked loop oscillator responsive to said sub-harmonic signal for generating a second clock signal at said second clock frequency in known phase relationship with said first clock signal for the operation of said upgrade microprocessor.

6. An accelerator board as defined in claim 5 including a data bus for the transmission of data signals between said system board and said enhanced microprocessor, and data latch means for transmitting said data signals on said data bus synchronously with the appropriate one of said first and second clock signals.

7. An accelerator board as defined in claim 5 including an address bus for the transmission of address signals from said enhanced microprocessor to said system board, and address bus latch means for transmitting said address signals on said address bus synchronously with said first clock signal.

8. An accelerator board as defined in claim 5 wherein said sub-harmonic signal has a frequency of 4 Mhz.

* * * * *